(12) United States Patent
Zhang et al.

(10) Patent No.: US 7,724,773 B2
(45) Date of Patent: May 25, 2010

(54) METHOD AND APPARATUS FOR UPLINK SCHEDULING SIGNALING IN A WIRELESS COMMUNICATION

(75) Inventors: Guodong Zhang, Farmingdale, NY (US); Allan Y. Tsai, Boonton, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 306 days.

(21) Appl. No.: 11/970,979

(22) Filed: Jan. 8, 2008

(65) Prior Publication Data
US 2008/0225693 A1 Sep. 18, 2008

Related U.S. Application Data

(60) Provisional application No. 60/883,935, filed on Jan. 8, 2007.

(51) Int. Cl.
*H04J 12/28* (2006.01)
(52) U.S. Cl. ....................... 370/468; 370/431
(58) Field of Classification Search ............ 370/349, 370/432, 326, 208, 329, 395.4, 468, 450, 370/464, 509, 516
See application file for complete search history.

(56) References Cited

U.S. PATENT DOCUMENTS 5,619,675 A * 4/1997 De Martine et al. ......... 711/133
5,644,748 A * 7/1997 Utsunomiya et al. ........ 711/207

OTHER PUBLICATIONS

Ericsson, "DFT Size for Uplink Transmissions," TSG-RAN WG1 #46bis, R1-062852 (Oct. 9-13, 2006).
NEC Group, "DFT Size," 3GPP TSG RAN WG1 Meeting #47, R1-063199 (Nov. 6-10, 2006).
Third Generation Partnership Project, "Technical Specification Group Radio Access Network; Physical layer aspects for evolved Universal Terrestrial Radio Access (UTRA) (Release 7)," 3GPP TR 25.814, V7.1.0 (Sep. 2006).

* cited by examiner

*Primary Examiner*—Brenda Pham
(74) *Attorney, Agent, or Firm*—Volpe and Koenig, P.C.

(57) ABSTRACT

A method and apparatus for efficient uplink scheduling grant and scheduling request signaling for evolved universal terrestrial radio access (E-UTRA) are disclosed. A wireless transmit/receive unit sends an uplink scheduling request to a Node-B, whereby the Node-B sends the uplink scheduling grant in response to the uplink scheduling request. The uplink scheduling request includes a data buffer occupancy value that indicates the amount of data that needs to be transmitted in the uplink. The amount of data is quantized to integer factors of the number of bits that may be supported by one RB, and mapped to an index value with N-bit mapping having less than full resolution. The uplink scheduling grant assigns a number of resource blocks to the WTRU for uplink transmission. The number of RBs allocated is mapped to an index value using N-bit mapping having less than full resolution.

15 Claims, 1 Drawing Sheet

METHOD AND APPARATUS FOR UPLINK SCHEDULING SIGNALING IN A WIRELESS COMMUNICATION

CROSS REFERENCE TO RELATED APPLICATION

This application claims the benefit of U.S. provisional application No. 60/883,935 filed Jan. 8, 2007, which is incorporated by reference as if fully set forth.

FIELD OF DISCLOSURE

The present embodiments are related to wireless communication systems. More particularly, a method and apparatus for efficient uplink scheduling grant and scheduling request signaling for evolved universal terrestrial radio access (E-UTRA) are disclosed.

BACKGROUND

In order to keep the technology competitive for a much longer time period, both third generation partnership project (3GPP) and 3GPP2 are considering long term evolution (LTE), in which evolution of radio interface and network architecture are necessary.

Currently, LTE specifies that uplink transmissions are to be based on single carrier-frequency division multiple access (SC-FDMA). One method for generating an SC-FDMA signal is to use a discrete Fourier transform (DFT) spread Orthogonal Frequency Division Multiple Access (OFDMA) processing. An N-size DFT is applied to a block of N modulation symbols, transforming the modulation symbols into the frequency domain. The result of the DFT is mapped onto the available subcarriers.

For the mapping, a basic scheduling unit in LTE is a resource block (RB), where uplink data is allocated to each WTRU in multiples of RBs. One RB typically consists of 12 subcarriers in the frequency domain. For wireless communications using a 20 MHz bandwidth, the channel is typically divided into 1200 subcarriers with 100 RBs available. As each wireless transmit/receive unit (WTRU) may have any number of RBs assigned to it for uplink transmission, the following constraints arise.

For a UE with N subcarriers (that is N/12 RBs) allocated in the uplink, a DFT precoding with a size of N will be applied, where N can be decomposed as the product of M prime factors' power and defined by the following equation:

$$N = \prod_{i=1}^{M} K_i^{L_i}. \quad \text{Equation 1}$$

In Equation 1 above, M represents the number of prime factors, $K_1, K_2, \ldots, K_M$ are prime factors and $L_1, L_2, \ldots, L_M$ are the corresponding powers.

The number of required complex multiplications, denoted by NDFT, is given by the following equation:

$$NDFT = N \sum_{i=1}^{M} K_i L_i. \quad \text{Equation 2}$$

Since a DFT precoding size N with large prime number factors causes very high transmitter implementation complexity, it is preferable to limit N to an integer that has only prime factors of 2, 3 and 5.

Secondly, in order to represent all integer numbers of RBs from 1 (or 0) to N/12, an n-bit mapping (n=$\lceil \log_2(N/12) \rceil$) is required if full resolution is used. In a LTE with 20 MHz, there are 100 available RBs. Therefore, a 7-bit mapping is required (i.e., $2^6 < 100 < 2^7$) if full resolution is used. However, 7 bits results in a relatively large overhead for a scheduling request by the WTRU and an uplink scheduling grant by the network.

In order to support a variety of uplink data rates with low transmitter complexity and low signaling overhead, a method is needed to reduce overhead in uplink scheduling grant mapping and uplink scheduling request signaling.

SUMMARY

A method and apparatus for efficient uplink scheduling grant and scheduling request signaling for E-UTRA are disclosed. A MAC Scheduler of the WTRU sends an uplink scheduling request to the Node-B, whereby the MAC Scheduler of the Node-B sends the uplink scheduling grant in response to the uplink scheduling request. The MAC Scheduler of a Node-B sends an uplink scheduling grant to a wireless transmit/receive unit (WTRU) to assign a resource block (RB) to the WTRU for uplink transmission. The uplink scheduling request includes the buffer occupancy of the WTRU. Less than full resolution for the n-bit mapping of allocated RBs is applied to reduce overhead in the uplink scheduling request and scheduling grant.

BRIEF DESCRIPTION OF THE DRAWING

A more detailed understanding may be had from the following description, given by way of example and to be understood in conjunction with the accompanying drawings wherein.

DETAILED DESCRIPTION

Figure 1:
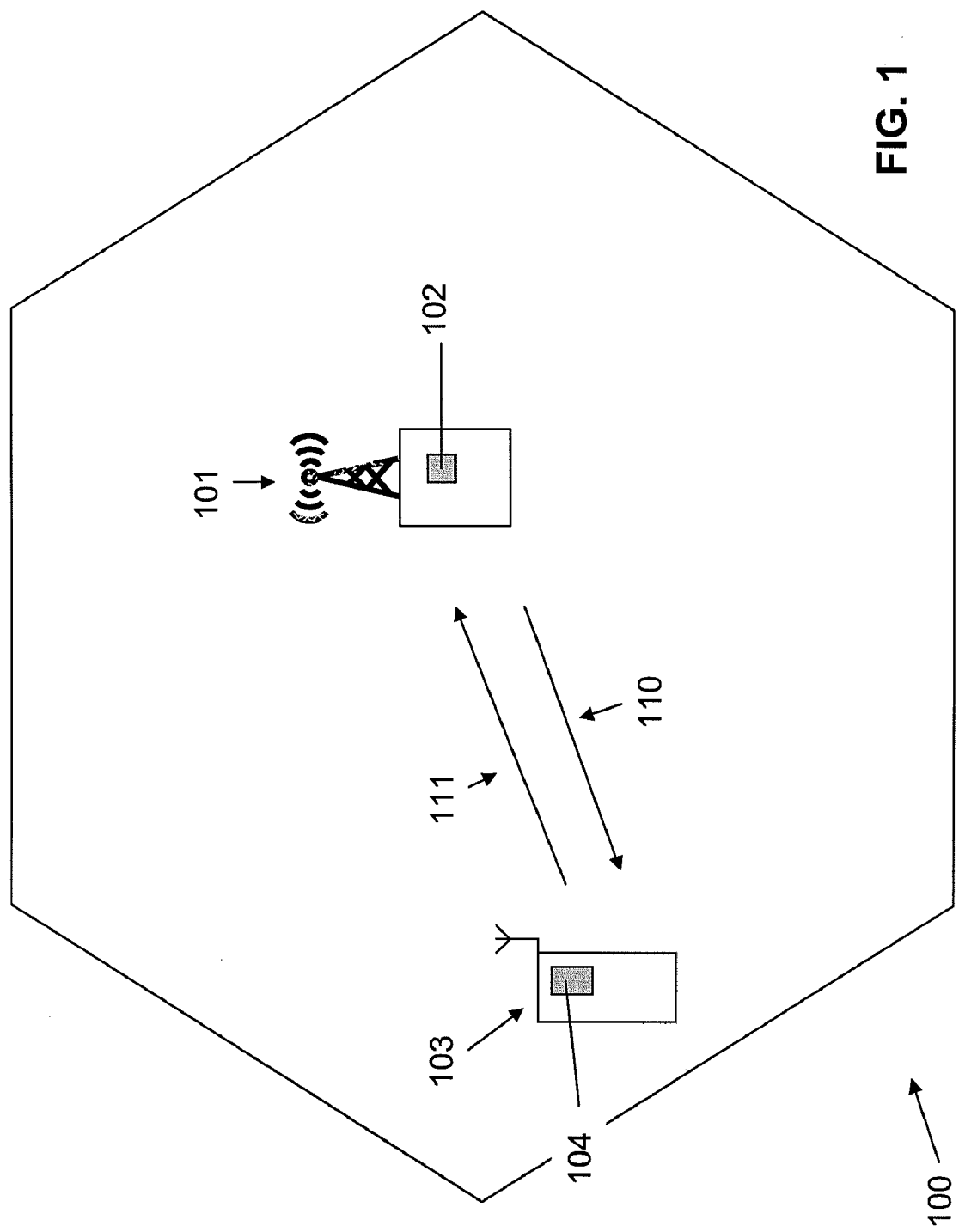
FIG. 1 shows an example of uplink scheduling request and grant signaling between a WTRU and a Node-B.

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

An uplink scheduling grant and uplink scheduling request signaling method for E-UTRA are disclosed. The embodiments disclosed consider the trade-off between performance and signaling overhead. These embodiments may be applied to any single-carrier frequency division multiple access (SC-FDMA) based uplink wireless communication systems.

Uplink Scheduling Request Signaling

FIG. 1 illustrates a cell 100 in which a WTRU 103 is in a communication link with a Node-B 101. On the uplink, the MAC Scheduler 104 of the WTRU 103 sends an uplink scheduling request 111 to the Node-B 101 to request uplink resources. The uplink scheduling request 111 indicates a WTRU buffer status, buffer occupancy, (i.e., the amount of data in the buffer), and associated priorities. The most important WTRU buffer status is buffer occupancy. The scheduling request could indicate WRTU buffer status which can be mapped using associated priorities. Using the associated priorities would require extra bit(s). For example, one extra bit to indicate either high or low priority. It is also possible to simply request a number of RBs which could then be mapped and transmitted in the UL scheduling request. In this case, the uplink scheduling request can be interpreted by the NodeB as buffer occupancy or number of RBs requested by the WTRU. In response, the Node-B 101 sends a scheduling grant 110.

In accordance with the present embodiment, the signaling of the buffer occupancy in the uplink scheduling request 111 is designed similar to the uplink scheduling grant 110 for efficient signaling. Table 1 shows an exemplary mapping of reported buffer occupancy using a 3-bit mapping, where one RB can support Y encoded bits of data. In this example, the mapping is according to $2^i Y$, where i represents the index value and $1 < 2^i \leq 100$ and assuming there are up to 100 RBs available. While a full resolution would require an index i=7 (i.e., $2^7=132>100$), this embodiment selects an index i=3 to reduce the overhead. Since the amount of data is capped at 100Y bits, the last index value in this example (i.e., 7) is the maximum for the system.

TABLE 1

| Amount of Data (bits) | Index |
|---|---|
| 1Y | 0 |
| 2Y | 1 |
| 4Y | 2 |
| 8Y | 3 |
| 16Y | 4 |
| 32Y | 5 |
| 64Y | 6 |
| 100Y | 7 |

Alternatively, variations of the factors for the amount of data values shown in Table 1 may be utilized. For example, for the index value of 4, the amount of data can be 15Y bits.

Uplink scheduling grant signaling

The MAC Scheduler 102 of a Node-B sends the uplink scheduling grant 110 signaling to a WTRU 103 for uplink transmission. The number of RBs granted is determined by selecting an n-bit mapping index value which is not divisible by large prime numbers. For example, candidates for the index value are selected such that it does not have a prime factor greater than or equal to 7. The n-bit index value can be a predetermined or dynamically selected value.

Another constraint is to select the value for allowed number of allocated uplink RBs, N/12, such that the mapping resolution is less than full resolution, and yet allowing sufficient resolution for effective resource allocation (i.e., the resulting mapping provides discrete multiples of RBs that satisfy the requirements for the WTRU uplink scheduling.)

For example, Table 2 presents RB grant n-bit mapping for n=5, instead of a full resolution requires 7-bit mapping of 0-100 RBs. With a 5-bit mapping, 32 indices are available for RB allocation in the uplink scheduling grant signaling. The resolution can be determined by calculating the difference between the number of RBs granted. For example, in Table 2 below, the resolution is equal to 1 for the lower index values between 0 and 6 (i.e., a one-to-one mapping). For index values greater than 9, the resolution decreases. For example, at index value 15, the mapping resolution is $24-20/24=1/6$.

TABLE 2

| Number of RBs granted | Index |
|---|---|
| 0 | 0 |
| 1 | 1 |
| 2 | 2 |
| 3 | 3 |
| 4 | 4 |
| 5 | 5 |
| 6 | 6 |
| 8 | 7 |
| 9 | 8 |
| 10 | 9 |
| 12 | 10 |
| 15 | 11 |
| 16 | 12 |
| 18 | 13 |
| 20 | 14 |
| 24 | 15 |
| 27 | 16 |
| 30 | 17 |
| 32 | 18 |
| 36 | 19 |
| 40 | 20 |
| 45 | 21 |
| 48 | 22 |
| 50 | 23 |
| 54 | 24 |
| 60 | 25 |
| 64 | 26 |
| 72 | 27 |
| 80 | 28 |
| 90 | 29 |
| 100 | 30 |
| Reserved | 31 |

Alternatively, a 4-bit mapping (i.e., 16 indices), may be used to represent all allowed scheduling grant RB allocations for a WTRU 103. Table 3 shows an example mapping for this case. Other variations may be utilized, so long as the value for Number of RBs granted has factors of low prime numbers, namely 2, 3 and/or 5.

TABLE 3

| Number of RBs granted | Index |
|---|---|
| 0 | 0 |
| 1 | 1 |
| 2 | 2 |
| 4 | 3 |
| 6 | 4 |
| 8 | 5 |
| 10 | 6 |
| 15 | 7 |
| 20 | 8 |
| 25 | 9 |
| 32 | 10 |
| 40 | 11 |
| 50 | 12 |
| 64 | 13 |
| 80 | 14 |
| 100 | 15 |

For both Tables 2 and 3 above, the index 0 can represent "reserved" instead of "0 RBs granted."

Although the features and elements are described in particular combinations, each feature or element can be used alone without the other features and elements or in various combinations with or without other features and elements. The methods provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for uplink scheduling signaling for a wireless transmit/receive unit (WTRU), the method comprising:
    mapping an uplink scheduling request, by a medium control (MAC) scheduler, using an N-bit index value, where N is selected such that less than full mapping resolution is provided, and the index value corresponds to an integer factor for a parameter related to uplink scheduling of WTRU resource allocation, said integer having two or more factors, each factor being a prime number less than 7; and
    transmitting the index value in an uplink scheduling request to a network entity,
    wherein the parameter is a data buffer occupancy in number of bits that need to be scheduled for transmission in the uplink.

2. The method as in claim 1, wherein the resource allocation is based on units of resource blocks (RBs).

3. The method as in claim 1, wherein the value for N is a predetermined value.

4. The method as in claim 1, wherein the mapping resolution is dynamically adjusted.

5. The method as in claim 1, wherein the uplink signaling is based on a single carrier frequency division multiple access (SC-FDMA) based modulation using a DFT spread orthogonal frequency division multiple access (OFDM) process.

6. A method for uplink transmission scheduling grant, comprising:
    mapping an uplink scheduling grant, by a medium access control (MAC) scheduler, using an N-bit index value, where N is selected such that less than full mapping resolution is provided, and the index value corresponds to an integer value of resource blocks to be granted to a wireless transmit/receive unit (WTRU) for uplink transmission, said integer having two or more factors, each factor having a prime number less than 7; and
    transmitting the index value in an uplink scheduling grant to the WTRU,
    wherein the resource blocks is a data buffer occupancy in number of bits that need to be scheduled for transmission in the unlink.

7. The method as in claim 6, wherein the value for N is a predetermined value.

8. The method as in claim 7, wherein the mapping resolution is dynamically adjusted.

9. A WTRU comprising:
    a medium access control (MAC) scheduler configured to map an uplink scheduling request using an N-bit index value, where N is selected such that less than full mapping resolution is provided, and the index value corresponds to an integer factor for a parameter related to uplink scheduling of WTRU resource allocation, said integer having two or more factors, each factor being a prime number less than 7; and configured to transmit the index value in an uplink scheduling request to a network entity,
    wherein the parameter is a data buffer occupancy in number of bits that need to be scheduled for transmission in the unlink.

10. The WTRU as in claim 9, wherein the resource allocation is based on units of resource blocks (RBs).

11. The WTRU as in claim 9, wherein the value for N is a predetermined value.

12. The WTRU as in claim 9, wherein the mapping resolution is dynamically adjusted.

13. A Node-B comprising:
    a medium access control (MAC) scheduler configured to map an uplink scheduling grant using an N-bit index value, where N is selected such that less than full mapping resolution is provided, and the index value corresponds to an integer value of resource blocks to be granted to a wireless transmit/receive unit (WTRU) for uplink transmission, said integer having two or more factors, each factor being a prime number less than 7, and configured to transmit the index value in an link scheduling grant to the WTRU,
    wherein the resource blocks is a data buffer occupancy in number of bits that need to be scheduled for transmission in the uplink.

14. The Node-B as in claim 13, wherein N is a predetermined value.

15. The Node-B as in claim 13, wherein the MAC scheduler is configured to dynamically select a mapping resolution.

* * * * *